July 26, 1938.  L. G. EHMANN  2,124,912
SHACKLE
Filed July 7, 1937   2 Sheets-Sheet 1
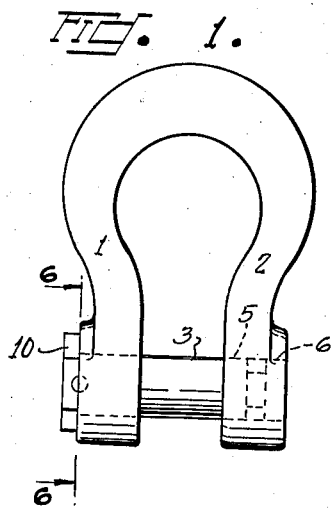
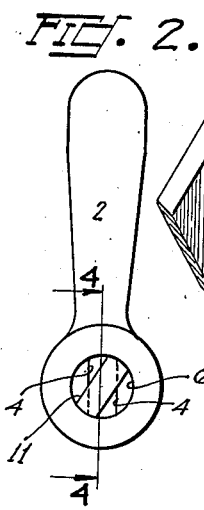
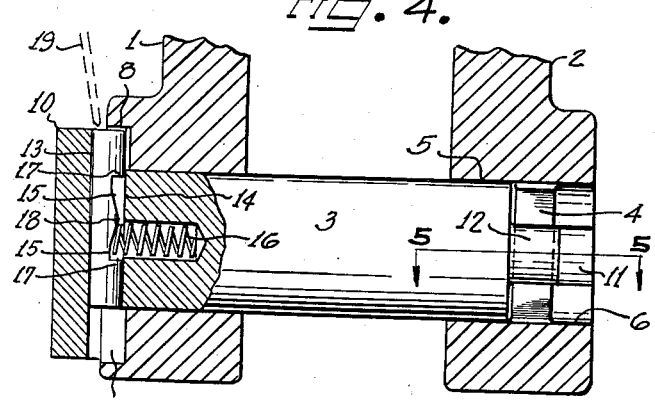
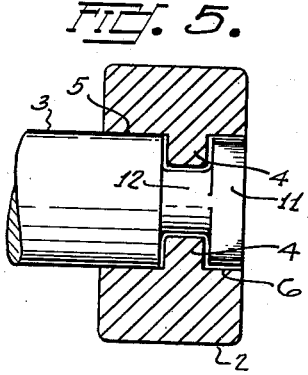
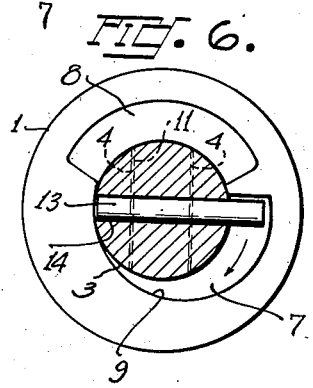
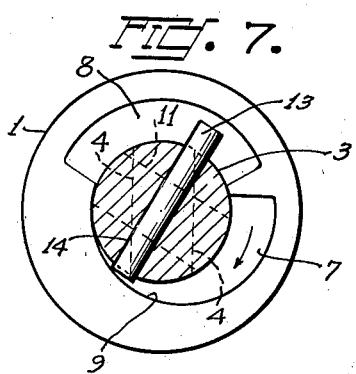
INVENTOR
LESLIE G. EHMANN
ATTORNEY July 26, 1938.                L. G. EHMANN                2,124,912
                                 SHACKLE
                           Filed July 7, 1937          2 Sheets-Sheet 2
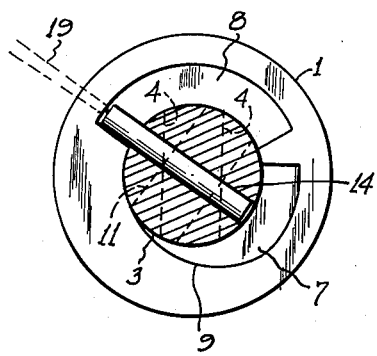
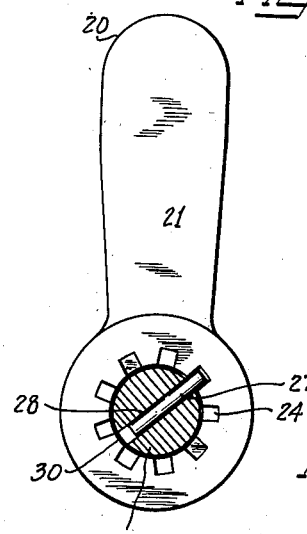
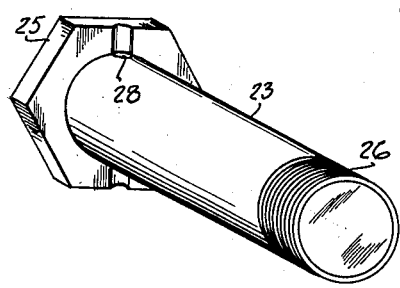
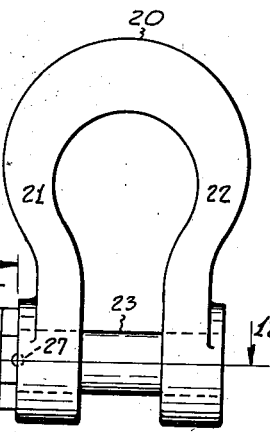
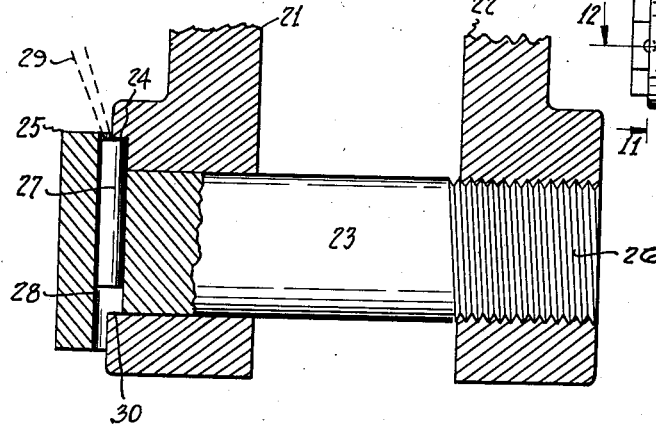
INVENTOR.
LESLIE G. EHMANN
BY 
ATTORNEY.

Patented July 26, 1938

2,124,912

UNITED STATES PATENT OFFICE 2,124,912

SHACKLE

Leslie G. Ehmann, Portland, Oreg. assignor to Electric Steel Foundry, Portland, Oreg., a corporation of Oregon Application July 7, 1937, Serial No. 152,361

6 Claims. (Cl. 59—86)

This invention relates to shackles and pins, and has particular reference to an improved locking device for securing the pin against accidental displacement from the shackle when in working position.

It is an object of the invention to provide a pin for a shackle and the like having means to engage the shackle when the pin is in working position to prevent accidental displacement of the pin.

A further object of the invention is to provide a shackle in which the pin is secured against accidental displacement when in working position, and in which position the pin is permitted a rotary motion.

A further object of the invention is to provide a pin for a shackle and the like which is readily inserted into working position, and which may readily be removed therefrom.

Additional objects and advantages of the invention will become apparent as the description proceeds in connection with the accompanying drawings, it being understood that the drawings are illustrative only and that various changes and modifications may be resorted to without departing from the spirit or scope of the invention; and I deem myself entitled to all such changes and modifications as fall within the scope of the claims hereto appended.

In the drawings:

Figure 1 is a side elevation of a shackle embodying the principles of the present invention.

Figure 2 is an end elevation of the shackle, taken from the right of Figure 1.

Figure 3 is a perspective view of the pin.

Figure 4 is a fragmentary side elevation, partly in section, taken along the line 4—4 of Figure 2, and particularly illustrating the locking mechanism.

Figure 5 is a sectional detail taken on the line 5—5 of Figure 4.

Figure 6 is a fragmentary end view of the shackle showing the pin in working position, and illustrating the initial step in positioning the pin to secure it against accidental displacement. The view is taken along the line 6—6 of Figure 1.

Figure 7 is a view similar to Figure 6 showing the movement of the locking bar as the pin is rotated into locked position.

Figure 8 is a view similar to Figure 6 showing the position of the locking bar with the pin locked in working position, and illustrating the initial step in removing the pin from the shackle.

Figure 9 is a side elevation of a shackle illustrating a modified construction embodying the principles of the invention.

Figure 10 is a perspective view of the pin employed in the modified construction.

Figure 11 is an end elevation of the shackle taken along the line 11—11 of Figure 9, and illustrating the locking bar in operative position.

Figure 12 is a side elevation, taken along the line 12—12 of Figure 9, illustrating the manner in which the locking bar is moved into inoperative position.

The invention is herein illustrated in its simplest form, the embodiment thereof comprising a shackle having arms 1 and 2 provided with aligned openings at their ends adapted to receive the pin 3. The opening in the arm 1 is circular in form and is clear, while the opening in the arm 2 is interrupted by parallel shoulders 4—4 midway of the opening. Inwardly of the shoulders 4—4 the opening in the arm 2 forms a bearing 5 for the pin 3. Outwardly of the shoulders 4—4 the opening in the arm 2 forms a recess 6 for the reception of the lug 11.

As best seen in Figures 6 to 8, the outer face of the arm 1 is recessed annularly of the opening therethrough, the cut away portion being interrupted to form disconnected recesses 7 and 8. The recess 7 is disposed eccentrically to the opening for the pin, its area diminishing from one end thereof to the other, and the edge or wall thereof approaching the wall of the opening to form a cam 9. The recess 8 is concentric with the opening for the pin, and is displaced from the recess 7 by an arc of approximately 130°.

The pin 3 is best illustrated in Figures 3 and 4 and comprises a hexagon head 10 at one end and a rectangular lug 11 at the other end. Intermediate the head 10 and the lug 11 the pin is round to conform to the openings in the arms of the shackle; there being however, a neck 12 interconnecting the lug 11 and the body of the pin, the diameter of which is such as will permit it to rotate in the opening defined by the opposed parallel shoulders 4—4.

Extending diametrically through the pin 3 is a lock bar 13. For the reception of this lock bar a hole 14 is drilled through the pin, the center of the hole being in the plane of the inside surface of the head 10. The bar 13 is of greater length than the diameter of the body portion of the pin 3, it being of sufficient length to extend from one side of the body portion of the pin and therethrough to the edge of the head 10 on the opposite side of the pin. The underside of the bar 13 is recessed as at 15.

Disposed in the center of the pin 3 in such manner as to engage the bar 13 is a helical spring 16. The spring 16 is designed to extend into the recess 15 of the bar 13 to prevent movement of the bar through the pin more than a predetermined distance in either direction. The recessed portion of the bar 13 is so formed that the point of greatest resistance to the spring 16 is at the longitudinal center of the bar, from which point 18 the surface engaged by the spring recedes toward the ends of the bar. The recess 15 is of such length as to permit the bar to be moved through the pin to the extent that an end thereof will project from the pin to the edge of the head 10. At the ends of the recess 15 the bar resumes its normal shape to close the ends of the hole 14, the ends of the bar forming stops 17 to be engaged by the spring 16 to prevent accidental displacement of the bar.

It will be noted that the lug 11 is disposed at right angles to the bar 13. Also that the hexagon head 10 is of sufficient size to form a cover for the recesses 7 and 8 in the face of the arm 1. The last mentioned construction is for the obvious purpose of preventing small rocks and other such foreign matter from entering the recesses and interfering with the locking mechanism.

To place the pin in the shackle, the pin is inserted through the aligned openings in the arms 1 and 2 in such manner that the rectangular lug 11 will enter the opening between the shoulders 4—4 in the arm 2. To accomplish this the bar 13 will of necessity have been moved through the pin so that it will project into the recess 7 at its widest point. This is the position illustrated in Figure 6. Thereupon, the pin is turned in the only direction possible, the cam-like wall 9 of the recess 7 serving to push the bar 13 through the pin to cause the opposite end thereof to project into the recess 8. As the bar is pushed through the pin by the cam 9, the spring 16, relatively speaking, moves from one end of the recess 15, across the raised portion 18 and into the other end of the recess. Thereupon, the spring engages the stop 17 to prevent further outward movement of the bar, and the bar is maintained in extended position by reason of the resistance offered the spring 16 by the inclined surface of the recess 15.

The recess 8 describes an arc of approximately 120°, and when the pin 3 is in locked position it is permitted a rotary motion commensurate with the permitted arcuate movement of the bar 13 from end to end of the recess 8. When the pin 3 is in locked position the lug 11 engages the shoulders 4—4, as shown in Figure 5, the end walls of the recess 8 preventing the pin from being rotated into a position to permit the lug to be withdrawn through the opening between the shoulders.

To remove the pin from the shackle, force must be applied to the end of the bar 13 to move it through the pin 3 to cause it to project into the recess 7, whereupon the pin may be rotated into position to enable the lug 11 to be withdrawn through the opening between the shoulders 4—4. In Figures 4 and 8 is illustrated the manner in which a punch 19 or other tool may be applied to push the bar 13 out of registry with the recess 8 and into registry with the recess 7. By referring to Figure 8 it will be seen that after the bar 13 shall have been moved into registry with the recess 7, the pin may then be rotated into the position shown in Figure 6, in which position the lug 11 is in alignment with the opening between the parallel shoulders 4—4 and the pin may be removed from the shackle.

In Figures 9 to 12 inclusive is illustrated a modified form of construction comprising a shackle 20 having arms 21 and 22 through the ends of which are aligned openings for the reception of a pin 23. One of the openings is internally threaded for the reception of the threaded end portion of the pin 23.

As best seen in Figures 11 and 12, the outer face of the arm 21 is recessed annularly of the opening therethrough, the cut out portions of the face of the arm forming spaced notches 24. The notches 24 are equal in size and depth and are positioned annularly of the opening through the arm in unopposed relation.

The pin 23 is cylindrical in shape to conform to the openings through the arms 21 and 22, and having a head 25 at one end and a screw thread 26 cut upon the other end for threadedly engaging the arm 22.

Extending diametrically through the pin 23 is a lock bar 27. For the reception of this bar a hole 28 is drilled through the pin, the center of the hole being in the plane of the inside surface of the head 25. The length of the bar is equal to the diameter of the pin, and when in inoperative position the bar is contained entirely within the body of the pin.

To place the pin 23 in the shackle 20 the pin is inserted in the aligned openings in the arms 21 and 22 and caused to threadedly engage the latter. When the pin has been tightened as much as desired, the hole 28 is caused to align with one of the notches 24 and the bar 27 is caused to project into the notch. To accomplish this a punch or nail may be inserted into the hole 28 to move the bar into the position illustrated in Figure 11. With the bar 27 in operative engagement with one of the notches 24 it is impossible to unscrew the pin from the shackle unless sufficient force be applied to shear off the projecting end of the bar.

To remove the pin from the shackle, a nail or punch is inserted in the hole 28 to move the bar 27 out of the notch 24 and into inoperative position, whereupon the pin may be unscrewed to disengage the shackle arm 22. In Figure 12 is illustrated the manner in which a nail 29 may be applied to push the bar 27 out of registry with the notch 24 and into inoperative position. The notches 24 are disposed in unopposed relation to prevent the bar from being moved through the pin and into registry with one of the other notches when it is desired to remove the pin from the shackle. The wall of the opening for the pin intermediate the notches 24 forms a stop 30 against which the bar abuts when moved into inoperative position.

Although the invention has been described as being particularly applicable to a shackle, its application is not necessarily confined thereto, but may be used either in its entirety or in part, and either with or without modifications, in any construction requiring a readily insertible and detachable pin, such as in trailer hitches and the like, and I deem myself entitled to all such uses, modifications and variations as fall within the spirit and scope of the appended claims.

Having now described my invention and in what manner the same may be used, what I claim as new and desire to protect by Letters Patent is:

1. A securing means having spaced apart, aligned openings for the reception of a pin, a recess disposed annularly of one of said openings, one portion of said recess forming a cam, a pin adapted to be inserted through said openings, said pin having a head at one end and having a lug at the other end for securing the pin in said openings, a bar disposed through said pin adjacent one end thereof, said bar being movable through said pin, said cam being adapted to engage said bar upon rotation of said pin to move the bar through said pin to lock said pin in working position.

2. In a pin for a shackle and the like, said pin having a head at one end and having means at the other end for securing the pin in the shackle, a bar disposed diametrically through said pin adjacent one end thereof, said bar being movable through said pin, spring actuated means for resisting the movement of said bar, and stop means engageable by said spring actuated means to limit the movement of said bar.

3. A shackle and the like having arms provided with aligned openings for the reception of a pin, the opening in one of said arms being interrupted by parallel shoulders midway of the opening, the outer face of the other of said arms being cut away annularly of the opening therethrough to form disconnected recesses adjacent said opening, the wall of one of said recesses approaching the opening to form a cam; a pin for said shackle having a head at one end and a lug on the other end, said lug being insertable between said parallel shoulders for engagement therewith when the pin is rotated, a bar disposed through said pin under said head for removably engaging one of said recesses, said cam being adapted to engage said bar upon rotation of said pin to move the bar through the pin to cause said pin to so engage one of said recesses as to secure the pin in working position.

4. A shackle and the like having arms provided with aligned openings for the reception of a pin, one of the openings being internally threaded for engagement by a pin, the outer face of the other of said arms being cut away annularly of the opening therethrough, the cut out portions of the face of the arm forming spaced notches positioned annularly of the opening in unopposed relation; a pin for said shackle having a head at one end and having a screw thread on the other end for threadedly engaging the threaded opening in the shackle arm, a bar disposed through said pin under said head for removably engaging one of said recesses to secure the pin in working position.

5. A shackle and the like having arms provided with aligned openings for the reception of a pin, means disposed in the opening of one of said arms for engaging a pin upon rotation of the pin therein, the outer face of the other of said arms being cut away annularly of the opening therethrough to form spaced recesses annularly of said opening; a pin for said shackle having a head at one end and having means at the other end for engaging the first above named means, a bar disposed through said pin under said head for removably engaging one of said recesses, said bar being movable through said pin into engagement with one of said recesses for securing the pin in working position, and means to resist accidental movement of the bar through said pin out of engagement with said recess.

6. A securing means having aligned openings for the reception of a pin, spaced recesses disposed annularly of one of said openings, means disposed in the other of said openings for engaging a pin upon rotation of the pin therein, a pin adapted to be inserted in said openings, said pin having a head at one end and having means at the other end for engaging the first above named means, a bar disposed through said pin under said head for removably engaging one of said recesses, said bar being movable through said pin into engagement with one of said recesses for securing the pin in working position, and means to resist accidental movement of the bar through said pin out of engagement with said recess.

LESLIE G. EHMANN.